Sept. 6, 1932.   E. JOHNSON   1,876,501
PROCESS OF MANUFACTURING CONCENTRATED FERTILIZERS
Filed Oct. 4, 1930
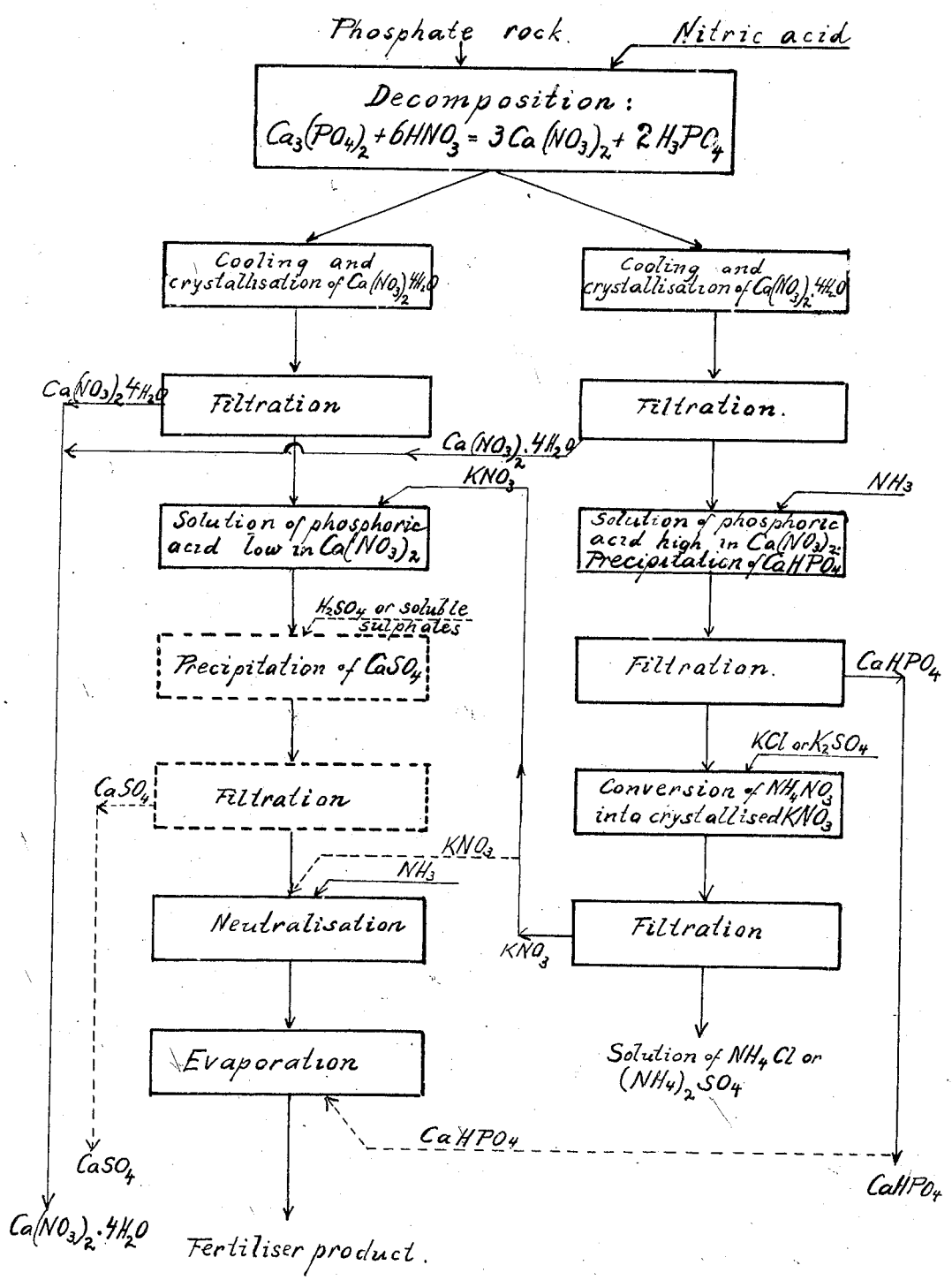

Patented Sept. 6, 1932

1,876,501

UNITED STATES PATENT OFFICE

ERLING JOHNSON, OF ODDA, NORWAY, ASSIGNOR TO THE FIRM ODDA SMELTEVERK A/S, OF ODDA, NORWAY

PROCESS OF MANUFACTURING CONCENTRATED FERTILIZERS

Application filed October 4, 1930, Serial No. 486,507, and in Norway October 11, 1929.

In my pending patent application 391,506 I have described a process of converting phosphate rock into soluble compounds and of separating its content of lime and phosphoric acid. According to said process the phosphate rock is by means of nitric acid converted into a solution of calcium nitrate and free phosphoric acid and from this solution a considerable part of the calcium nitrate is crystallized out, leaving a mother liquor which besides phosphoric acid contains more or less calcium nitrate and some nitric acid.

My present invention relates to a method of manufacturing concentrated universal fertilizers from said mother liquor and potassium chloride.

The accompanying flow sheet illustrates the process. The essential steps are indicated by full lines, and the steps which may, but need not necessarily be used in the process are indicated by dotted lines.

The invention is based upon the combination of reactions set forth below.

The phosphate rock is first dissolved in nitric acid according to the reaction (1) $2Ca_3(PO_4)_2 + 12HNO_3 = 6Ca(NO_3)_2 + 4H_3PO_4$ This solution is divided into two portions which are treated separately. One half, or any other convenient fraction of the solution, is treated under such conditions of concentration, intensive cooling etc. that the greatest possible quantity of calcium nitrate is caused to crystallize as represented by the following equation (2a) $2H_3PO_4 + 3Ca(NO_3)_2$
     $\phantom{(2a)\ }+3Ca(NO_3)_2 = 2H_3PO_4$
leaves the process.

The second portion is likewise subjected to a crystallization but this crystallization is only carried to that extent at which sufficient calcium nitrate is still retained in the solution to form di-calcium phosphate with the phosphoric acid of the solution. For this purpose only 1/3 of the total calcium nitrate of the solution is removed as crystals as represented by the equation:

(2b) $2H_3PO_4 + 3Ca(NO_3)_2$
     $\phantom{(2b)\ }+\ Ca(NO_3)_2\} = 2Ca(NO_3)_2 + 2H_3PO_4$
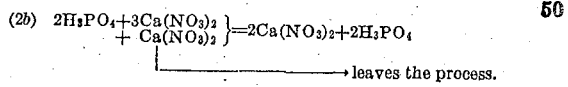leaves the process.

The mother liquor from the operation 2b. is subjected to neutralization with ammonia or ammonium carbonate according to the reaction:

(3) $2H_3PO_4 + 2Ca(NO_3)_2 + 4NH_3 = 4NH_4NO_3 + 2CaHPO_4$
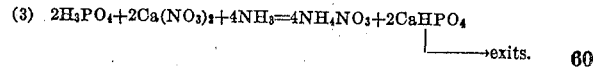exits.

Di-calcium phosphate is precipitated and is filtered off and washed. The remaining liquid contains ammonium nitrate.

This solution is caused to react with potassium chloride according to the equation:

(4) $4NH_4NO_3 + 4KCl = 4KNO_3 + 4NH_4Cl$
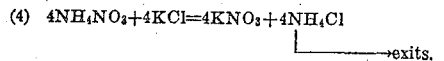exits.

Potassium nitrate and ammonium chloride are formed, which latter leaves the process. By treating the ammonium chloride with lime, ammonia may be recovered, while calcium chloride leaves the process.

The potassium nitrate obtained according to reaction (4) is mixed with and dissolves in the phosphoric acid solution resulting from reaction (2a) and the mixture is neutralized with ammonia:

(5) $2H_3PO_4 + 4KNO_3 + 4NH_3 = 4KNO_3 + 2(NH_4)_2HPO_4$ which gives a mixture of potassium nitrate and di-ammonium phosphate. The final products leaving the process are: calcium nitrate according to Equations 2a. and 2b., di-calcium phosphate (Equation 3) ammonium chloride (Equation 4) and as main product (Equation 5) a universal fertilizer containing 4 mol potassium nitrate to two mol di-ammonium phosphate with the following content of plant-food components:

A. 4KNO₃  
2(NH₄)₂HPO₄

| | | | Relative ratio |
|---|---|---|---|
| 188 parts of K₂O | =28 per cent | | 1.7 |
| 142 parts of P₂O₅ | =21 " | " | 1.3 |
| 112 parts of N. | =16.5 " | " | 1.- |

It is immediately evident that according to the conditions of working that is, the degree of crystallization of the calcium nitrate, the apportionment of mother liquor among the reactions 2a. and 2b. and consequently according to the quantity of di-calcium phosphate precipitated in reaction (3), the quantity of ammonium nitrate converted into potassium nitrate etc., products may be obtained in which the ratio of plant-food components may be varied at will within wide limits.

It is to be pointed out that in practical work it is not possible to realize a quite complete crystallization of calcium nitrate as supposed in Equation 2a. An output of 85 per cent of crystals is however easily reached. Yet, this fact has no detrimental influence upon the carrying out of the process. At worst the rest of the calcium retained in solution may result in that some 10 per cent of the phosphoric acid present in the mixed product is only citrate-soluble, while the rest of the phosphoric acid is water-soluble. If desired the rest of the calcium may however be removed as calcium sulphate by precipitation with sulphuric acid, ammonium—or potassium sulphates etc. The precipitant may be recovered. As it is only a fraction of the initial calcium content which eventually is to be removed, no large quantities of precipitants are necessary and need be circulated.

The greater or smaller surplus of nitric acid, which may be present in the primary solution of phosphate rock in nitric acid enters the final product in the shape of ammonium nitrate.

As already mentioned the relative ratio of components in the finished product may be varied at will within wide limits.

By slight modifications of the process, products may be obtained of the following compositions:

B. 3KNO₃  
1NH₄NO₃  
2NH₄H₂PO₄

| | | | Relative ratio |
|---|---|---|---|
| 131 parts of K₂O | =21 per cent | | 1.3 |
| 142 parts of P₂O₅ | =23 " | " | 1.4 |
| 98 parts of N. | =16 " | " | 1.0 |

In this product 4/7 of the nitrogen is in the form of nitrate, 3/7 in the form of ammonia.

C. 2KNO₃  
0.5NH₄NO₃  
2(NH₄)₂HPO₄

| | | | Relative ratio |
|---|---|---|---|
| 95 parts of K₂O | =19 per cent | | 1.0 |
| 142 parts of P₂O₅ | =28 " | " | 1.5 |
| 98 parts of N. | =19 " | " | 1.0 |

Of the nitrogen some 1/3 is nitrate nitrogen and 2/3 ammonia nitrogen.

The neutralization of the liquors with ammonia may conveniently be effected in counter-current with ammonia gas, for instance in the manner that the liquor by means of nozzles and such like is injected into an ammoniacal atmosphere. Under these conditions a dry neutralized product ready for use may immediately be obtained.

The neutralization with ammonia may be continued to the di-ammonium phosphate stage or only until mono-ammonium phosphate is formed. The former is supposed in the products A and C above, the latter in the product B. The neutralization may however be continued to a mixture of the two salts in any desired proportion. The composition of the finished product may vary somewhat according to special purposes and requirements.

The di-calcium phosphate leaving the process may be utilized separately or it may be added to the finished compound product in suitable proportions in order to augment its content of phosphoric acid by some citrate soluble one, which may lead to fertilizers of physiologically neutral or alkaline nature.

Further compound fertilizers of physiologically alkaline reactions may be prepared separately from the di-calcium phosphate and the calcium nitrate obtained in this process. Such fertilizers free from inactive substances are for example obtained when the calcium nitrate from the reactions 2a. and 2b. is mixed with di-phosphate and potassium nitrate, to which some urea may be added in order to increase the content of nitrogen. If for example two mol of di-calcium phosphate are mixed with two mol of potassium nitrate which are not used in Example C above and when further one mol. of calcium nitrate from the process and 2 mol. of urea are added a product is obtained which in the dry state has the following composition:

2 mol. of CaHPO₄.2H₂O  
1 mol. of Ca(NO₃)₂H₂O  
2 mol. of CO(NH₂)₂  
2 mol. of KNO₃

| | | | Relative ratio |
|---|---|---|---|
| 142 parts of P₂O₅ | =16.7 per cent | | 1.1 |
| 95 parts of K₂O | =11.2 " | " | 0.75 |
| 128 parts of N. | =15.0 " | " | 1.0 |

If desired the content of potassium nitrate may be augmented materially by addition of potassium nitrate produced by conversion of the calcium nitrate obtained in the process with potassium salts.

If the phosphoric acid containing mother liquor is so apportioned that no part of the liquor is used according to reaction 2a. the phosphoric acid is exclusively obtained in the citrate soluble form as di-calcium phosphate according to reaction (3) and a mixed product may be prepared with the entire phosphoric acid in this form. The potassium nitrate for admixture may in this case be prepared by converting the ammonium nitrate formed in the process with potassium chloride. It is evident that the composition of the product, and the ratio of components may be widely varied according to the quantity of ammonium nitrate which is used for conversion with potassium chloride. If the total quantity of ammonium nitrate is converted into potassium nitrate according to reaction (4) and if the entire quantity of potassium nitrate so obtained is admixed, a compound fertilizer of the following composition results.

with a theoretical content of 7.5 per cent nitrogen, 19 per cent phosphoric acid, 24 per cent potash, and 15 per cent calcium oxide with a relative ratio between the three first components of 1:2.5:3.2. If the ammonium nitrate solution is only partly converted with potassium chloride and a part of the ammonium nitrate is admixed as such, products for example of the following composition may be obtained:

with 10.4 per cent nitrogen, 17.6 per cent citrate-soluble phosphoric acid, 11.8 per cent potash and 14% lime as di-calcium phosphate with a relative ratio between the three first components of 1:1.7:1.1.

Further, di-calcium phosphate may be returned to the process for treatment with nitric acid together with a fresh portion of phosphate rock.

In this last-named way the total phosphoric acid of the phosphate rock used may be transformed according to reaction (5) into a mixed fertilizer with exclusively water-soluble phosphoric acid.

The di-calcium phosphate may even, before it is returned for treatment with nitric acid be subjected to a treatment with ammonia or ammonium carbonate whereby a certain quantity of di-ammonium phosphate is obtained in solution and may be used as admixture for preparing the compound fertilizer. The tri-calcium phosphate or the mixture of di-phosphate and calcium carbonate obtained by this reaction is filtered off and is returned to treatment with nitric acid together with fresh quantities of phosphate rock. By this manner of working only a minimum of phosphatic residue needs be returned to the system.

In the process described only very simple, easily performable reactions are used. During the sequence of reactions the racting substances and the products formed are to the greatest possible extent withdrawn from circulation. It is even possible to avoid the returning of any components of reaction and still to obtain finished products of desired composition and well-balanced ratio of components. The process is therefore exceedingly economical and accommodable and offers considerable advantages as compared with prior methods. An important merit is to be seen in the fact that the reactions may be carried out in relatively concentrated solutions, so that evaporation costs are reduced to a minimum.

Instead of using potassium chloride for preparing the potassium nitrate from the ammonium nitrate solution, potassium sulphate may serve for said purpose. The choice of potassium salt to be used is essentially a question of market prices. As is well known, the reaction of ammonium nitrate with potassium sulphate is most conveniently carried out in presence of free nitric acid, whereby ammonium sulphate or ammonium sulphate-nitrate is formed and leaves the process.

Besides by conversion of the ammonium nitrate available in the process, potassium nitrate may be prepared from the calcium nitrate, resulting in the reactions 2a. and 2b. by conversion with potassium sulphate or chloride.

I claim:

1. A process of manufacturing concentrated universal fertilizers, comprising dissolving phosphate rock in nitric acid to form a solution containing calcium nitrate and free phosphoric acid, dividing the solution so obtained into two portions, cystallizing from the first of said portions as much as possible of the calcium nitrate present, and separating the crystals from the remaining mother liquor, subjecting also the second portion of the initial solution to crystallization of calcium nitrate but only to such extent that sufficient lime in the shape of nitrate is retained in solution to form di-calcium phosphate with all the phosphoric acid present, separating the crystals of calcium nitrate from the solution, adding ammonia to the latter to precipitate di-calcium phosphate and to give a solution of ammonium nitrate, separating di-calcium phosphate from the solution, converting the ammonium nitrate of the solution by means of potassium salts into potassium nitrate, which is crystallized out and a solution of ammonium salt, separating the potassium nitrate crystals from said solution, adding said potassium nitrate to the first portion of mother liquor poor in calcium nitrate, neutralizing the mixture with ammonia and bringing the product to dryness.

2. A process of manufacturing concentrated universal fertilizers, comprising dissolving phosphate rock in nitric acid to form a solution containing calcium nitrate and free phosphoric acid, dividing the solution so obtained into two portions, crystallizing from the first of said portions as much as possible of the calcium nitrate present, separating the crystals from the mother liquor, removing from said mother liquor the rest of calcium by precipitation as calcium sulphate, subjecting the second portion of the initial solution to crystallization of calcium nitrate to such extent that sufficient calcium nitrate is retained in solution to form di-calcium phosphate with the phosphoric acid present, separating the crystals of calcium nitrate from the solution, adding ammonia to the latter to precipitate di-calcium phosphate and to give a solution of ammonium nitrate, separating di-calcium phosphate from the solution, converting the ammonium nitrate of the solution by means of potassium salts into potassium nitrate, which crystallizes out, and a solution of ammonium salt, separating the potassum nitrate crystals from said solution, adding said potassium nitrate to the first portion of mother liquor free from calcium nitrate, neutralizing the mixed liquor with ammonia and bringing the product to dryness.

3. A process of manufacturing concentrated universal fertilizers, comprising dissolving phosphate rock in nitric acid to form a solution containing calcium nitrate and free phosphoric acid, dividing the solution so obtained into two portions, crystallizing from the first of said portions as much as possible of the calcium nitrate present, separating the crystals from the mother liquor, subjecting the second portion of the initial solution to crystallization of calcium nitrate to such extent that sufficient calcium nitrate is retained in solution to form di-calcium phosphate with the phosphoric acid present, separating the calcium nitrate crystals from the solution, adding ammonia to the latter to precipitate di-calcium phosphate and to give a solution of ammonium nitrate, separating di-calcium phosphate from the solution, converting the ammonium nitrate of the solution by means of a potassium salt into potassium nitrate which crystallizes out and a solution of ammonium salt, separating the potassium nitrate crystals from said solution, adding said potassium nitrate to the first portion of mother liquor poor in calcium nitrate and neutralizing the mixed liquor with ammonia by distribution in an atmosphere of ammonia gas for obtaining immediately a dry, neutralized product.

4. A process of manufacturing concentrated universal fertilizers, comprising dissolving phosphate rock in nitric acid to form a solution containing calcium nitrate and free phosphoric acid, dividing the solution so obtained into two portions, crystallizing from the first of said portions as much as possible of the calcium nitrate present, separating the crystals from the mother liquor, subjecting the second portion of the initial solution to crystallization of calcium nitrate to such extent that sufficient calcium nitrate is retained in solution to form di-calcium phosphate with the phosphoric acid present, separating the crystals of calcium nitrate from the solution, adding ammonia to the latter to precipitate di-calcium phosphate and to give a solution of ammonium nitrate, separating di-calcium phosphate from the solution, converting the ammonium nitrate of the solution by means of a potassium salt into potassium nitrate which crystallizes out and a solution of ammonium salt, separating the potassium nitrate crystals from said solution, adding said potassium nitrate to the first portion of mother liquor poor in calcium nitrate, neutralizing the mixed liquor with ammonia, adding a convenient quantity of di-calcium phosphate obtained in the process to the neutralized product and bringing the mixture to dryness.

In testimony that I claim the foregoing as my invention I have signed my name.

ERLING JOHNSON.